(No Model.) 2 Sheets—Sheet 1.
J. J. GREEN.
SUPPLY SYSTEM FOR ELECTRIC RAILWAYS.
No. 522,711. Patented July 10, 1894.
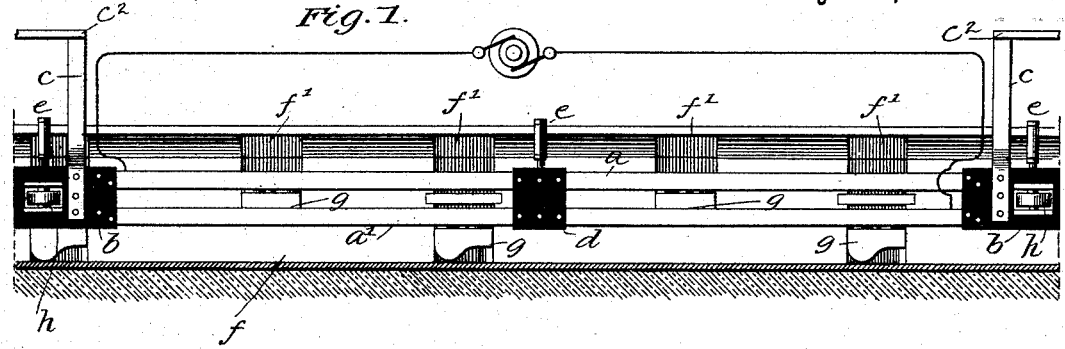
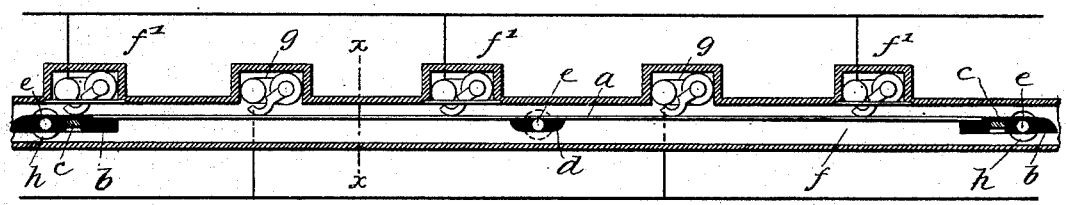
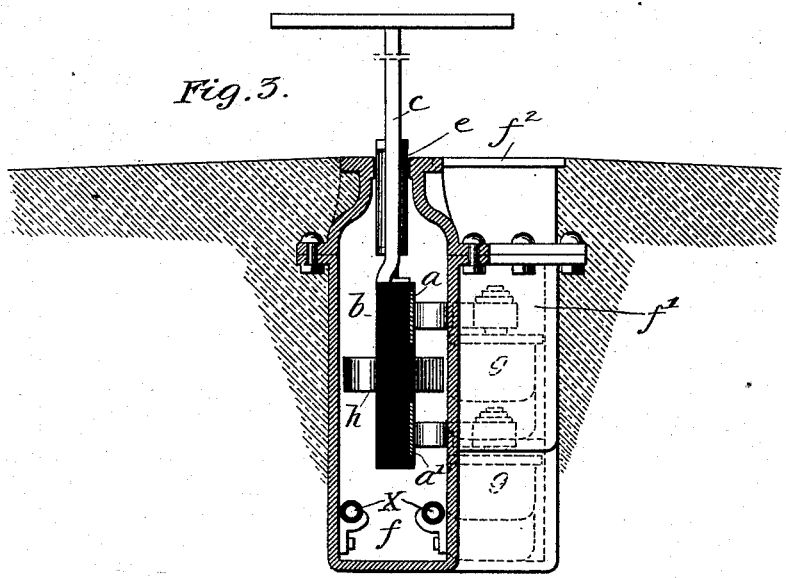
WITNESSES: Frank S. Ober, Alfred W. Van Zee
INVENTOR John Jay Green
BY Baldwin, Davidson & Wight
ATTORNEYS.

(No Model.) 2 Sheets—Sheet 2.

J. J. GREEN.
SUPPLY SYSTEM FOR ELECTRIC RAILWAYS.

No. 522,711. Patented July 10, 1894.

WITNESSES:
Frank S. Ober
Alfred W. Van Zee

INVENTOR
John Jay Green
BY
Baldwin, Davidson & Wight
ATTORNEYS

UNITED STATES PATENT OFFICE.

JOHN JAY GREEN, OF BOONTON, NEW JERSEY, ASSIGNOR TO THE CONDUIT CONSTRUCTION COMPANY, OF NEW YORK, N. Y.

SUPPLY SYSTEM FOR ELECTRIC RAILWAYS.

SPECIFICATION forming part of Letters Patent No. 522,711, dated July 10, 1894.

Application filed October 9, 1893. Serial No. 487,638. (No model.)

*To all whom it may concern:*

Be it known that I, JOHN JAY GREEN, a citizen of the United States, residing at Boonton, in the county of Morris and State of New Jersey, have invented certain new and useful Improvements in Electric Railways, of which the following is a specification.

The contact shoe for electric railways forming the subject of this invention is distinctive from others heretofore devised in that the contact plates are arranged one above the other, in, or about in, the same vertical plane. This construction admits of the production of a very flexible strong and simple shoe, and one in which the chances of short circuits, due to accumulation of moisture are reduced to a minimum, it also admits of all the contact boxes or other devices in the conduit for connecting the shoe to the electric mains, being placed on one side only of the conduit. The construction also contemplates an improvement in electric conduits to be used in conjunction with this shoe, the same consisting in making a conduit of much less width than is required for present methods, and forming in the side or sides of the conduit pockets for the contact boxes of the electric circuit. This narrowing of the conduit is made feasible by arranging the strips of the shoe in a vertical plane, and thus a great saving will be had in installing a conduit system, as less material will be required in the construction of the conduit, and less excavation be necessary in placing it.

Figure 4:
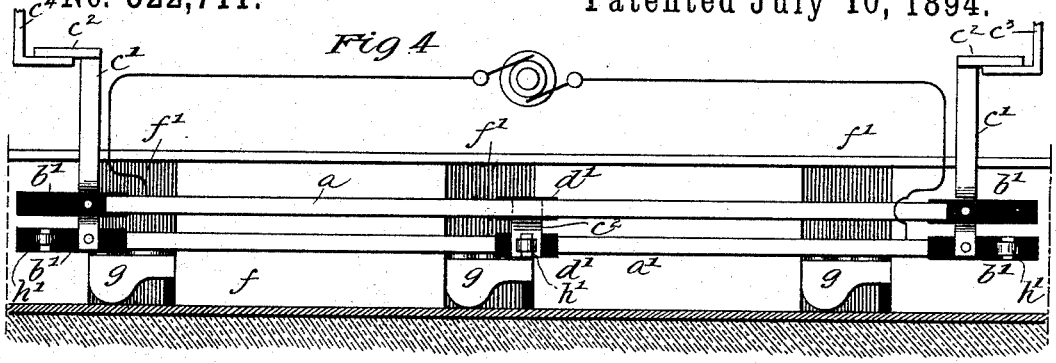
Figure 5:
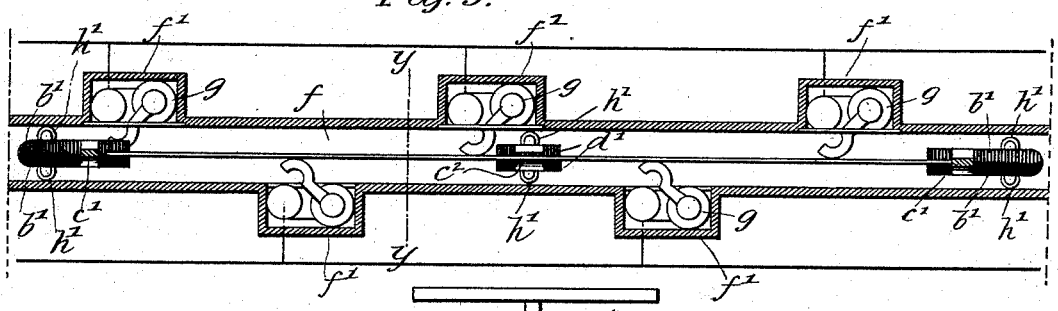
Figure 6:
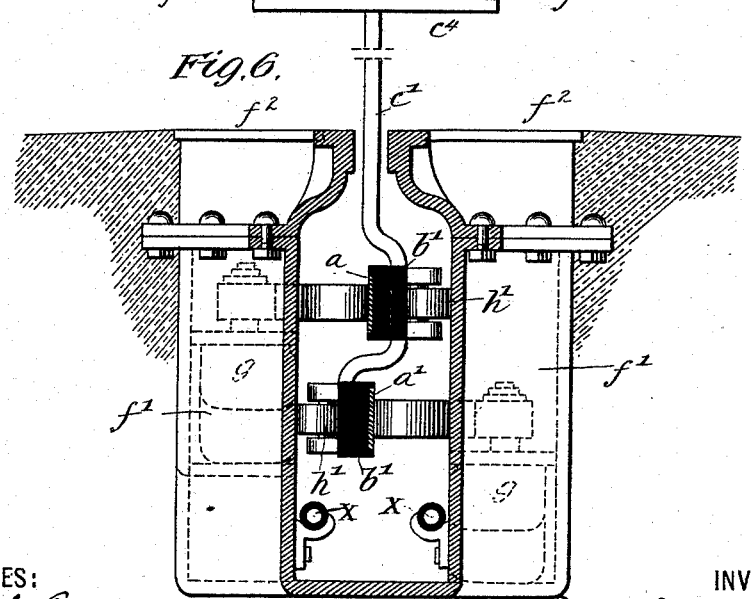

Figure 1 is a side elevation of a contact shoe and conduit made according to my invention in which the contacts are made on one side only of the shoe. Fig. 2 is a longitudinal, horizontal section of the conduit below the top thereof. Fig. 3 is a transverse section on the line $x\ x$. Fig. 4 is a side elevation showing a shoe and conduit in which the contacts are made on both sides of the shoe. Fig. 5 is a horizontal, longitudinal sectional view of the conduit below the top thereof. Fig. 6 is a transverse section of the same on the line $y\ y$.

The shoe comprises solely the upper strip $a$ and the lower strip $a'$ or flexible metal, the pieces of insulating material $b$ or $b'$ to which the ends of the strips $a$ and $a'$ are rigidly attached and also to which the suspending bars $c$ or $c'$ are attached, the central piece of insulating material $d$ or $d'$ connected rigidly to the middle of the strips $a$ and $a'$, and guide rollers $e\ e$, fitted on studs to work in the slot of the conduit.

In the plan of construction shown in Figs. 1, 2 and 3, the two strips $a$ and $a'$ are fastened to one side of the pieces of insulating material $b\ b$ and $d$, the suspending bars $c\ c$ being secured to the other sides of the pieces $b\ b$ and $d$ and offset as shown to bring the strips $a$ and $a'$ practically in the center of the conduit $f$. The ends of the leading faces of the end pieces $b\ b$ are beveled or rounded to cause them to strike the switch contacts of the contact boxes with ease. This conduit $f$ is as shown very narrow, its main interior being only sufficiently wide for the free movement of the shoe therein, and at intervals at its side are formed the pockets $f'\ f'$, for the reception of the contact boxes $g\ g$, the switch contacts of which only project within the main portion of the conduit. Each pocket may contain a contact box for each of the shoe strips or separate pockets for each contact box may be used. The main electric lines X may be arranged in any suitable way, preferably they are placed in the main portion of the conduit, as indicated in Figs. 3 and 6. Each pocket is provided with a cover $f^2$ to admit of easy access to the contact boxes $g\ g$.

To overcome or resist the tendency of the contact switches of the boxes $g\ g$, to push the shoe away from its central position in the conduit, while bearing against it, I propose to provide the end pieces of insulating material $b\ b$, with bearing rollers arranged to project beyond the rear faces of these pieces and act against the continuous wall of the conduit.

In the plan shown in Figs. 4, 5 and 6, the contact strips $a$ and $a'$ are arranged to bear against the contact switches of the boxes $g\ g$ on opposite sides, the end and the central insulating pieces being each made in this case in two parts $b'\ b'$ and $d'\ d'$ separately connected to the two strips $a$ and $a'$, and the suspending bars $c'\ c'$ as well as the connecting bar $c^2$ at the center of the shoes are formed with a double offset to leave the bearing faces of the strips free as clearly shown at Fig. 6.

The conduit in this case, while in its main feature being similar to the one just described, that is being very narrow, will have the pockets $f'f'$ formed in its two sides for the reception of the contact boxes.

Resisting guide rollers $h'h'$ will in some cases be advantageous, they will, when used project from the rear faces of the pieces $b'b'$ and $d'd'$.

The suspending bars $cc'$ may be connected to the motor car in any suitable manner, bearing plates $c^2$, $c^3$ and $c^4$ being shown adapted for this purpose, and the electrical connections between the motor car and the contact strips of the shoe can also be made in any known and suitable manner.

Only one central insulated connection, and guide roller is shown in the drawings, any number of such connections and guide rollers may be used between the ends of the contact strips, but on account of the flexibility of the shoe and the tendency or inclination of the strips to assume similar and perfect curves by reason of their being in one vertical plane, it is believed that less connections and controlling devices will be required than in any other style of contact shoe.

I claim as my invention—

1. A shoe for electric railways having contact plates or strips with side contact faces arranged in or about the same vertical plane, one above the other.

2. A shoe for electric railways having contact strips with side contact faces arranged in or about the same vertical plane, plates or blocks of insulating material secured to the ends of the strips, and suspending bars secured to the insulating material.

3. The combination with an electric conduit, of a shoe having contact strips with side contact faces arranged in or about the same vertical plane, plates or blocks of insulating material secured to the strips, suspending bars secured to the insulating material, and contact boxes having contact arms arranged to engage with the contact faces of the shoe.

4. A shoe for electric railways, consisting of contact strips arranged in or about the same vertical plane, plates or blocks of insulating material secured to the ends of the strips, suspending bars secured to the insulating material, an electric conduit, contact boxes arranged in the conduit, and rollers carried by the plates or blocks of insulating material and arranged to bear against the side wall of the conduit.

5. A shoe for electric railways, consisting of contact strips arranged in or about the same vertical plane, plates or blocks of insulating material secured to the ends of the strips, suspending bars secured to the insulating material, plates or blocks of insulating material secured to the central part of the strips, and rollers at the end and center of the shoe adapted to work in the slot of a conduit.

6. A shoe for electric railways, consisting of contact strips arranged in or about the same vertical plane, plates or blocks of insulating material secured to the ends of the strips, suspending bars secured to the insulating material, plates or blocks of insulating material secured to the central part of the strips, rollers at the end and center of the shoe adapted to work in the slot of a conduit, and rollers projecting from the insulating pieces arranged to bear against the side wall or walls of the conduit.

7. A narrow electric conduit having pockets for the electric connections formed in its sides in combination with contact boxes arranged in the sections and having contact arms arranged in different horizontal planes, and a contact shoe having contact plates or strips arranged to engage with the contact arms.

8. The combination of a shoe for electric railways, consisting of contact strips arranged in or about the same vertical plane, plates or blocks of insulating material secured to the ends of the strips, suspending bars secured to the insulating material, a narrow conduit having pockets formed in its side, and contact boxes located in said pockets.

9. The combination of a shoe for electric railways, consisting of contact strips in or about the same vertical plane, plates or blocks of insulating material secured to the ends of the strips, suspending bars secured to the insulating material, plates or blocks of insulating material secured to the central part of the strips, rollers at the end and center of the shoe adapted to work in the slot of a conduit, a narrow conduit having pockets formed in its side, and contact boxes located in said pockets.

10. The combination of a shoe for electric railways, consisting of contact strips arranged in or about the same vertical plane, plates or blocks of insulating material secured to the ends of the strips, suspending bars secured to the insulating material, plates or blocks of insulating material secured to the central part of the strips, rollers at the end and center of the shoe adapted to work in the slot of a conduit, rollers projecting from the insulating pieces arranged to bear against the side wall or walls of the conduit, a narrow conduit having pockets formed in its side, and contact boxes located in said pockets.

11. The combination of a shoe for electric railways, consisting of contact strips arranged in or about the same vertical plane, plates or blocks of insulating material secured to the ends of the strips, suspending bars secured to the insulating material, plates or blocks of insulating material secured to the central part of the strips, rollers at the end and center of the shoe adapted to work in the slot of a conduit, rollers projecting from the insulating pieces arranged to bear against the side wall or walls of the conduit, a narrow conduit having pockets formed in its side, and contact boxes located in said pockets, and formed to partly bridge over the openings of said pockets.

12. A narrow electric conduit having pockets for the electrical connections formed at the side, in combination with covers for the pockets, and contact boxes having switch arms in different horizontal planes, for the purpose specified.

In testimony whereof I have hereunto subscribed my name.

JOHN JAY GREEN.

Witnesses:
FRANK S. OBER,
ALFRED W. VAN ZEE.